(12) United States Patent
Bouman et al.

(10) Patent No.: US 8,135,186 B2
(45) Date of Patent: Mar. 13, 2012

(54) METHOD AND SYSTEM FOR IMAGE RECONSTRUCTION

(75) Inventors: Charles A. Bouman, West Lafayette, IN (US); Ken David Sauer, South Bend, IN (US); Jean-Baptiste Thibault, Milwaukee, WI (US); Zhou Yu, Shanghai (CN)

(73) Assignees: Purdue Research Foundation, West Lafayette, IN (US); General Electric Company, Schenectady, NY (US); University of Notre Dame Du Lac, Notre Dame, IN (US)

( * ) Notice: Subject to any disclaimer, the term of this patent is extended or adjusted under 35 U.S.C. 154(b) by 1070 days.

(21) Appl. No.: 12/020,311

(22) Filed: Jan. 25, 2008

(65) Prior Publication Data

US 2009/0190814 A1 Jul. 30, 2009

(51) Int. Cl.
  *G06K 9/00* (2006.01)
(52) U.S. Cl. .............. 382/128; 378/4; 378/8; 378/19; 600/300; 382/131
(58) Field of Classification Search ....................... None
  See application file for complete search history.

(56) References Cited

U.S. PATENT DOCUMENTS

| | | | |
|---|---|---|---|
| 5,053,958 A | 10/1991 | Tam | |
| 5,909,476 A | 6/1999 | Cheng et al. | |
| 6,507,633 B1 | 1/2003 | Elbakri et al. | |
| 6,768,782 B1 * | 7/2004 | Hsieh et al. | 378/8 |
| 6,850,585 B2 | 2/2005 | Hsieh et al. | |
| 6,907,102 B1 * | 6/2005 | Sauer et al. | 378/19 |
| 7,519,143 B2 | 4/2009 | Debasish et al. | |
| 2003/0156684 A1 | 8/2003 | Fessler | |
| 2006/0062443 A1 | 3/2006 | Basu et al. | |
| 2006/0072801 A1 | 4/2006 | Deman et al. | |
| 2006/0104408 A1 * | 5/2006 | Thibault et al. | 378/4 |
| 2006/0104410 A1 * | 5/2006 | Sauer et al. | 378/4 |

OTHER PUBLICATIONS

Jean-Baptiste Thibault, Ken Sauer, Charles Bouman, and Jiang Hsieh, "A Three-Dimensional Statistical Approach to Improved Image Quality for Multi Slice Helical CT," Medical Physics, to appear, Nov. 2007.

Jean-Baptiste Thibault, Ken Sauer, Charles Bouman, and Jiang Hsieh, "Three-dimensional Statistical Modeling for Image Quality Improvements in Multi-Slice Helical CT," International Conference on Fully 3D Reconstruction in Radiology and Nuclear Medicine, Salt Lake City, Utah, USA Jul. 6-9, 2005.

Jean-Baptiste Thibault, Ken Sauer, Charles Bouman, and Jiang Hsieh, "High Quality Iterative Image Reconstruction for Multislice Helical CT" Proceedings of the Fully 3-D Conference, Jun. 29-Jul. 4, 2003.

(Continued)

*Primary Examiner* — John Lee
(74) *Attorney, Agent, or Firm* — Cantor Colburn LLP

(57) ABSTRACT

Disclosed is an imaging system including a source generating an x-ray beam, a detector array receiving the x-ray beam and generating projection data, a translatable table configured for disposal of an object thereon and operable to translate in relation to the source and the detector array, the source and the detector array rotating about the translatable table to scan the object, and an image reconstructor electrically coupled to the detector array and configured to reconstruct an image in response to the projection data via an iterative reconstruction technique configured to perform a targeted statistical reconstruction.

17 Claims, 11 Drawing Sheets

OTHER PUBLICATIONS

J.-B., Thibault, Z. Yu, C. Bouman, K. Sauer, J. Hsieh, "A Non-Homogeneous Update Method for Iterative Reconstruction," GE patent, filed with the USPTO Nov. 16, 2006, U.S. Appl. No. 11/561,114.

K Sauer and C. Bouman, "A Local Update Strategy for Iterative Reconstruction from Projections," IEEE Trans. on Sig. Proc., vol. 41, No. 2, pp. 534-548, Feb. 1993.

C. A. Bouman and K. Sauer, "A Unified Approach to Statistical Tomography using Coordinate Descent Optimization," IEEE Trans. on Image Processing, vol. 5, No. 3, pp. 480-492, Mar. 1996.

"Accelerated Image Reconstruction Using Ordered Subsets of Projection Data", H. Hudson and R. Larkin, IEEE Transactions on Medical Imaging, Col. 13, No. 4, pp. 601-609, Dec. 1994.

"Simultaneous Transmission/Emission Myocardial Perfusion Tomography Diagnostic Accuracy of Attenuation-Corrected 99mTc-SestamibiSingle-Photon Emission Computed Tomography", Circulation. 1996;93:463-473., E Ficaro, J. Fessler, P. Shreve, J. Kritzman, P. Rose, J. Corbett; Department of Internal Medicine, Division of Nuclear Medicine, University of Michigan Medical Center (Ann Arbor); American Heart Association, 1996.

"Fast Hybrid Algorithms for PET Image Reconstruction", Q. Li, S. Ahn, R. Leahy, 2005 IEEE Nuclear Science Symposium Conference Record, pp. 1851-1855, IEEE 2005.

"A study of four minimization approaches for iterative reconstruction in X-ray CT", B. De Man, S. Basu, J. Thibault, J. Hsieh, J. Fessler, C. Bouman, K. Sauer, 2005 IEEE Nuclear Science Symposium Conference Record, pp. 2708-2710, IEEE 2005.

J.-B. Thibault, Bruno De Man, Samit Basu, Z. Yu, C. Bouman, K. Sauer, J. Hsieh, "Method and System for Iterative Reconstruction", GE patent, filed with the USPTO Nov. 17, 2006, U.S. Appl. No. 11/561/114.

* cited by examiner

FIG. 9A
FIG. 9B
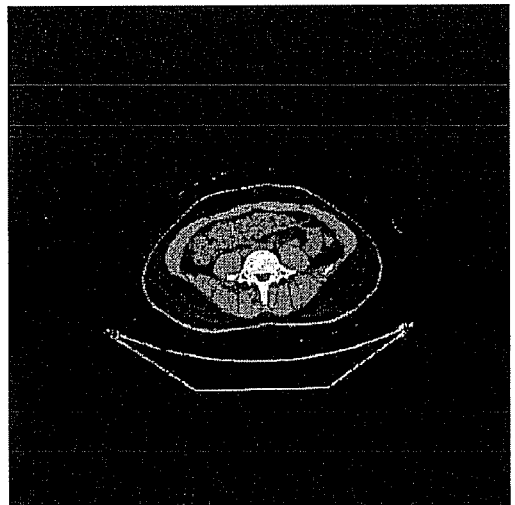
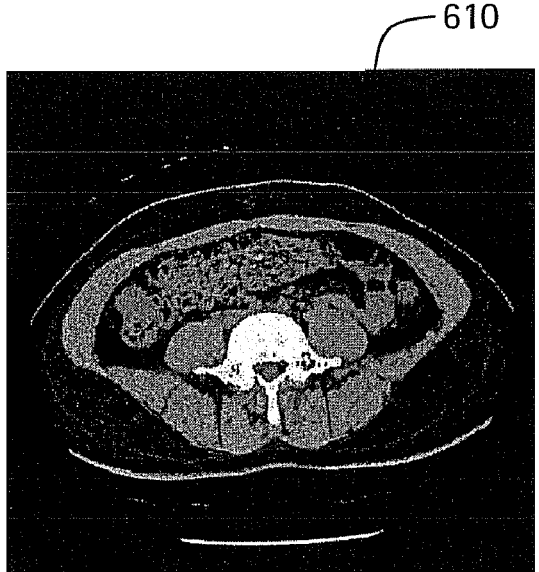

METHOD AND SYSTEM FOR IMAGE RECONSTRUCTION

FIELD OF THE INVENTION

The disclosure relates generally to imaging systems and particularly to systems and methods of reconstructing an image using iterative techniques

BACKGROUND OF THE INVENTION

A computed tomography (CT) imaging system typically includes an x-ray source that projects a fan-shaped x-ray beam through an object being imaged, such as a patient, to an array of radiation detectors. The beam is collimated to lie within an X-Y plane, generally referred to as an "imaging plane". Intensity of radiation from the beam received at the detector array is dependent upon attenuation of the x-ray beam by the object. Attenuation measurements from each detector are acquired separately to produce a transmission profile.

The x-ray source and the detector array are rotated within a gantry and around the object to be imaged so that a projection angle at which the x-ray beam intersects the object constantly changes. A group of x-ray attenuation measurements (such as integral projection data from the detector array at one gantry angle) is referred to as a "view". A "scan" of the object comprises a set of views made at varying projection angles, during one revolution of the x-ray source and detector array.

In an axial scan, the projection data is processed to construct an image that corresponds to a two-dimensional slice taken through the object. For discrete slices, iterative reconstruction of a full field of view may be performed in order to increase image quality. Iterative reconstruction refers to a method which forms an image by repeatedly adjusting an existing estimate according to the quality of a match between measured data and simulated measurements from a current estimate of the image. The quality of the match may also be affected by consideration of the characteristics of the image alone, such as its smoothness and/or satisfaction of a pre-established model. Multiple iterations are performed to create a resulting reconstructed image that approximately matches the acquired projection data. A full set of reconstructed images is referred to as a 3-D reconstruction, since the set is formed into a three dimensional representation of the object with each image pixel or picture element corresponding to a single voxel or volume element in the 3-D reconstruction.

To reduce the total scan time required for multiple slices, a "helical" scan may be performed. Helical scan techniques allow for large volumes to be scanned at a quicker rate using a single photon source. To perform a "helical" scan, the patient is moved along the z-axis, the axis about which the gantry rotates, synchronously with the rotation of the gantry, while data for a prescribed number of slices are acquired. Such a system generates a single helix from a fan beam helical scan. The helix mapped out by the fan beam yields projection data from which images in each prescribed slice may be reconstructed. In addition to reducing scan time, helical scanning provides other advantages such as better use of injected contrast, improved image reconstruction at arbitrary locations, and better three-dimensional images.

Traditionally, direct analytical algorithms, such as the Filtered Back-Projection (FBP) algorithm, have been used to reconstruct images from CT data. Iterative techniques, such as the Maximum A Posteriori Iterative Coordinate Descent (MAP-ICD) algorithm, have also been recently considered for reconstruction of volumetric CT data to provide means to improve general image quality over conventional techniques. It has been demonstrated that reduced noise, enhanced resolution, better low contrast performance, and reduced artifacts, can all be achieved with iterative reconstruction of clinical images. Iterative algorithms generally work by optimizing over a cost function formed of a data fit term and a penalization term. The data fit term describes a model wherein synthesized projections from an image estimate must match the acquired projection measurements, and may include a statistical weighting to apply different degrees of confidence to each datum depending on its noise characteristics. The penalization term typically enforces a smoothness constraint on the reconstructed images, and may treat differently homogeneous regions and regions with a large local gradient such as edges and organ boundaries. An iterative algorithm is applied to iteratively refine an image estimate from a set of initial conditions so as to minimize the resulting global cost function. When the minimum of the cost function has been achieved, the iterative algorithm has converged to the solution. For multi-slice CT data, the solution is a three-dimensional volume of image estimates that best matches the acquired data based on the model described in the cost function.

One of the algorithms developed for iterative optimization of the cost function is the Iterative Coordinate Descent (ICD) algorithm. The ICD algorithm attacks the problem of optimization of the multi-dimensional cost function as a sequence of one-dimensional greedy updates for fast convergence. Each pixel in image space may be updated independently of all the other pixels, and forms a single dimension in the N-dimensional problem, where N is the total number of pixels in the imaged volume. In order to speed up convergence, a spatially non-homogeneous version of ICD has been introduced, which is referred to as NH-ICD. With this NH-ICD approach, the order in which the pixels are selected for update is optimized to focus computation on the regions of the reconstructed volume that are most in need of updating. In conventional ICD, all pixels are updated once and once only per iteration. With NH-ICD, some voxels may be updated more often than others based on the update needs for appropriate convergence. This leads to the definition of an "equivalent iteration" to describe the amount of computation equivalent to a single update of the entire image volume, where each "equivalent iteration" with NH-ICD may correspond to only to a partial image update. NH-ICD functions to speed up convergence for a reconstruction over the full field of view.

In the clinical environment, however, all images are reconstructed to zoom over the portion of the anatomy relevant for diagnosis, rather than reconstructing cross-sections of the whole patient. In order to reconstruct a targeted area, iterative reconstruction algorithms differ from conventional techniques such as FBP in that they generally require reconstructing the entire field of view, which includes all the objects measured by the CT system. Such a full field reconstruction is performed with iterative reconstruction algorithms in order to achieve good image quality. This is due to the fact that iterative reconstruction requires the consideration of all possible sources of x-ray attenuation along the whole path lengths between the x-ray source and the detector. However, this implies significant computational cost in targeted reconstruction of a small area. For instance, reconstructing a 512×512 image in 35 cm field of view where the bore of the CT scanner is 70 cm in diameter requires iterating over a 1024×1024 image in 70 cm field of view to guarantee that all possible sources of x-ray attenuation are captured in the reconstruction. That would be four times the number of voxels reconstructed with FBP.

So far, multi-resolution techniques have been developed for targeted iterative reconstruction. A multi-resolution technique starts with a low-resolution reconstruction (for instance a 512×512 700 mm reconstruction), which is then followed by a high-resolution targeted reconstruction (for instance, a 1024×1024 700 mm reconstruction where only the center 35 cm are updated). In the low-resolution reconstruction, all pixels in the 700 mm field of view are reconstructed. The low-resolution reconstructed images are then interpolated up and used as the initial conditions for the high-resolution reconstruction. The high-resolution reconstruction starts with a full forward projection of the initial images in full field of view and then reconstructs only in a region of interest (ROI). This method works well but is inefficient because: 1) all the pixels are reconstructed in low-resolution regardless of the final target ROI, and 2) changing resolution requires a full forward projection in high-resolution to eliminate any possible errors between the low-resolution and high-resolution synthesized projections. A more effective method is needed to improve the speed and quality of the targeted reconstructions.

BRIEF DESCRIPTION OF THE INVENTION

Disclosed is an imaging system including a source generating an x-ray beam, a detector array receiving the x-ray beam and generating projection data, a translatable table configured for disposal of an object thereon and operable to translate in relation to the source and the detector array, the source and the detector array rotating about the translatable table to scan the object, and an image reconstructor electrically coupled to the detector array and configured to reconstruct an image in response to the projection data via an iterative reconstruction technique configured to perform a targeted statistical reconstruction.

Also disclosed is a method of reconstructing an image of an object including providing projection data generated by a scanning device, and performing an iterative reconstruction technique to reconstruct the image in response to the projection data, wherein the reconstruction technique performs a targeted statistical reconstruction.

Further disclosed is a method of reconstructing an image including scanning an object to acquire projection data, performing an iterative reconstruction technique to reconstruct the image in response to the projection data, wherein the reconstruction technique includes, weighting each of a plurality of pixels in the image according to a contribution of each of the pixels to a region of interest, updating in low resolution each of the plurality of pixels that the weighting determines to be most contributory to the region of interest, performing a high resolution forward projection in the region of interest and performing a low resolution forward projection over the remaining area of the image, correcting for a resulting cumulative forward projection that is not scale-invariant, and updating in high resolution high frequency components disposed outside of the region of interest; and performing a targeted statistical reconstruction via the reconstruction technique.

BRIEF DESCRIPTION OF THE DRAWINGS

The invention will be described in conjunction with the accompanying drawings, in which:

FIGS. 9a-9b are pictorial views illustrating a pictorial representation of a portion of the exemplary reconstruction of FIG. 4;

DETAILED DESCRIPTION OF THE INVENTION

Definitions

Figure 1:
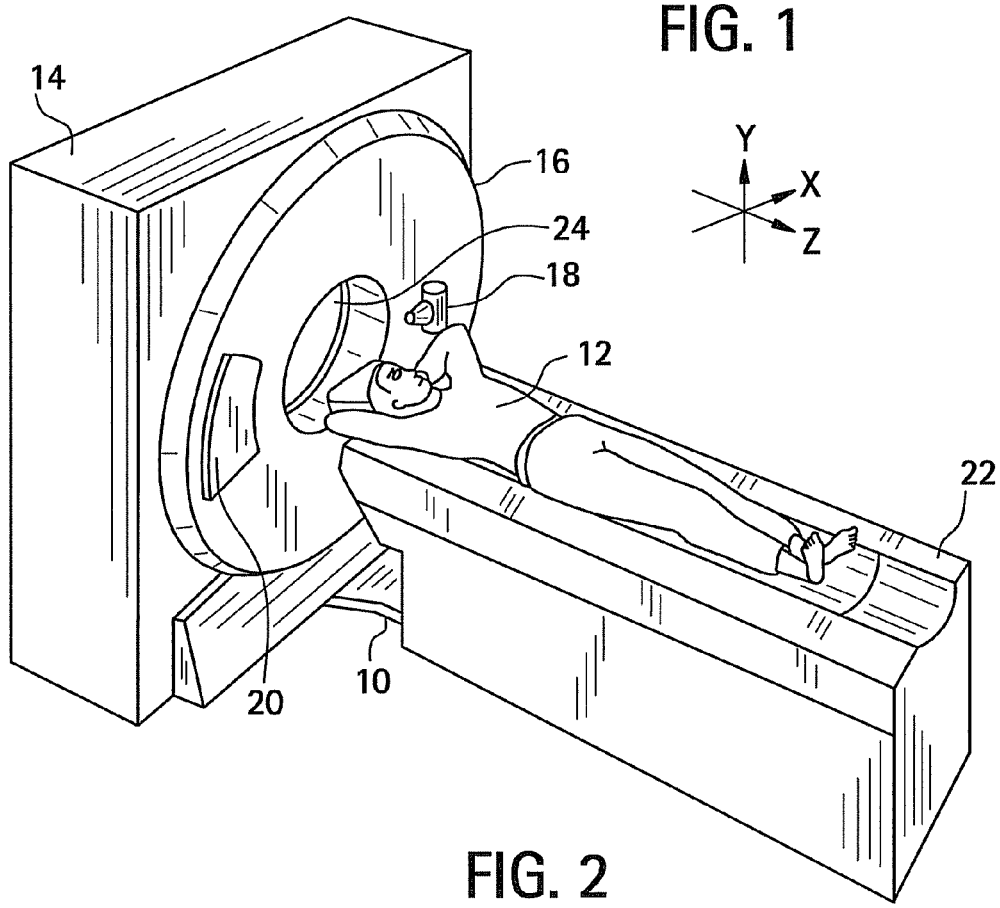
FIG. 1 is a pictorial view of a multi-slice helical scan CT imaging system utilizing a method of reconstructing an image in accordance with an embodiment of the present invention.

Where the definition of terms departs from the commonly used meaning of the term, applicant intends to utilize the definitions provided below, unless specifically indicated.

For the purposes of the present invention, the term "image space" refers to a set of vectors arranged in an array for use with a method of the present invention. The array may be of any number of dimensions, such as two-dimensional, three-dimensional, four-dimensional, for example. An example of an image space that may be used in a method of the present invention is a set of all possible images representable on a lattice of a given dimension. A single element (vector) of the set of the image space may be viewed on a visual display apparatus to allow a user to gain information of the interior of a scanned object.

For the purposes of the present invention, the term "forward model" refers to a description of the transformation from the image space of a scanned object to the projection space for a scanned object, as modeled after the operation of the CT imaging system. The operation of the forward model on an image vector is referred to as "forward projection."

For the purposes of the present invention, the term "computed tomography model" refers to a mathematical description of the relation between a vector in the image space and a vector in the projection space. A computed tomography model includes a forward model and a cost function chosen to evaluate the closeness of a match between a projection vector and a forward projection of an image vector by a forward model.

For the purpose of the present invention, the term "projection space" refers to a set of vectors of integral X-ray attenuation values. The vectors that make up a projection space may comprise data from an X-ray CT scanner. Also, the vectors that make up a projection space may be forward projections of vectors from an image space.

For the purposes of the present invention the term "visual display device" refers to any type of device such as a CRT monitor, LCD screen, projected image, etc. used to visually inspect multidimensional vectors.

For the purposes of the present invention, the term "multi-slice computed tomography imaging system" refers to an X-ray CT scanner in which a detector array contains multiple rows of detectors, each row occupying a different position along the axis of the system about which the gantry rotates.

For the purposes of the present invention, the term "filtered backprojection" refers to a technique of reconstructing images from projection data by processing data in the projection space, then forming the value of each element in the image space as a linear combination of values from processed data, those values taken from projection space points to which the given image element contributes in forward projection. Filtered backprojection techniques are described in such places as Avinash C. Kak and Malcolm Slaney, "Principles of Computerized Tomographic Imaging," Classics in Applied Mathematics, 33, SIAM, 2001, ISBN:089871494X, the entire contents and disclosure of which is hereby incorporated by reference.

For the purposes of the present invention, the term "high quality reconstruction image" refers to an image space vector whose accuracy as a representation of the object under study is comparable to those produced by currently available commercial CT imaging systems and known in the art.

DESCRIPTION

While the present invention is described with respect to apparatus and methods of reconstructing an image using iterative techniques for a computed tomography (CT) imaging system (such as a multi-slice CT imaging system), the following apparatus and method are capable of being adapted for various purposes including, but not limited to the following applications: magnetic resonance imaging (MRI) systems, CT systems, radiotherapy systems, X-ray imaging systems, ultrasound systems, nuclear imaging systems, magnetic resonance spectroscopy systems, and other applications known in the art, such as but not limited to applications outside medical imaging like non destructive testing, geological and astronomical imaging, and in general a large class of inverse problems including any form of estimation over a cost function which requires an iterative algorithm to achieve the solution.

In the following description, various operating parameters and components are described for one constructed embodiment. These specific parameters and components are included as examples and are not meant to be limiting.

Referring now to FIG. 1, a pictorial view of a CT imaging system 10 (multi-slice system in an exemplary embodiment), utilizing a method of reconstructing an image of medical patient 12 in accordance with an embodiment of the present invention is shown. The imaging system 10 includes a gantry 14 that has a rotating inner portion 16 containing an x-ray source 18 and a detector array 20. X-ray source 18 projects a beam of x-rays toward detector array 20. Source 18 and detector array 20 rotate about an operably translatable table 22. Table 22 is translated along the z-axis between source 18 and detector 20 to perform a helical scan. The beam, after passing through medical patient 12, within a patient bore 24, is detected at detector array 20 to generate projection data that is used to create a CT image.

Figure 2:
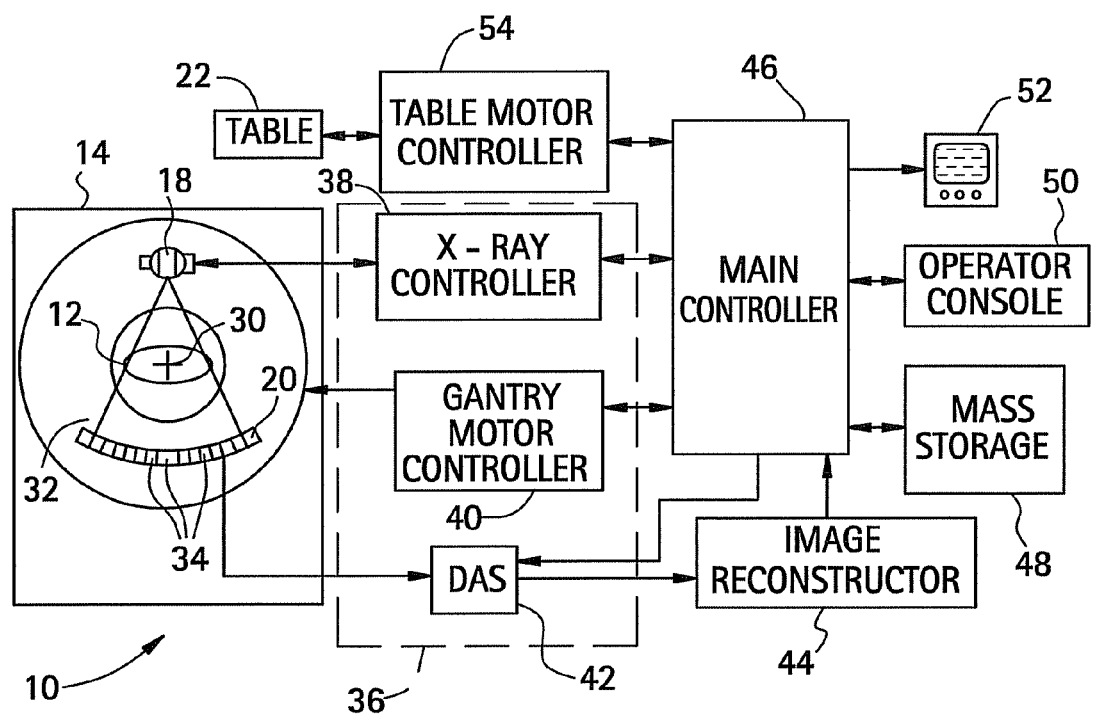
FIG. 2 is a block diagrammatic view of the multi-slice helical scan CT imaging system in accordance with an embodiment of the present invention.

Referring now to FIG. 2, a diagrammatic view of system 10 in accordance with an embodiment of the present invention, is shown. Source 18 and detector array 20 rotate about a center axis 30. Beam 32 is received by multiple detector elements 34 in multiple detector rows. Each detector element 34 generates an electrical signal corresponding to the intensity of an impinging x-ray beam. As beam 32 passes through patient 12, beam 32 is attenuated. Rotation of the center portion of the gantry and the operation of source 18 are governed by a control mechanism 36. Control mechanism 36 includes an x-ray controller 38 that provides power and timing signals to source 18 and a gantry motor controller 40 that controls the rotational speed and position of the center portion of the gantry. A data acquisition system (DAS) 42 samples analog data from detector elements 34 and converts the analog data to digital signals for subsequent processing. An image reconstructor 44 receives sampled and digitized x-ray data from DAS 42 and performs image reconstruction. A main controller 46 stores the CT image in a mass storage device 48.

Main controller 46 also receives commands and scanning parameters from an operator via an operator console 50. A display 52 allows the operator to observe the reconstructed image and other data from main controller 46. The operator supplied commands and parameters are used by main controller 46 in operation of DAS 42, x-ray controller 38, and gantry motor controller 40. In addition, main controller 46 operates a table motor controller 54, which translates table 22 to position patient 12 in gantry 14.

X-ray controller 38, gantry motor controller 40, image reconstructor 44, main controller 46, and table motor controller 54 are preferably based on micro processors, such as a computer having a central processing unit, memory (RAM and/or ROM), and associated input and output buses. X-ray controller 38, gantry motor controller 40, image reconstructor 44, main controller 46, and table motor controller 54 may be a portion of a central control unit or may each be stand-alone components as shown.

Figure 3:
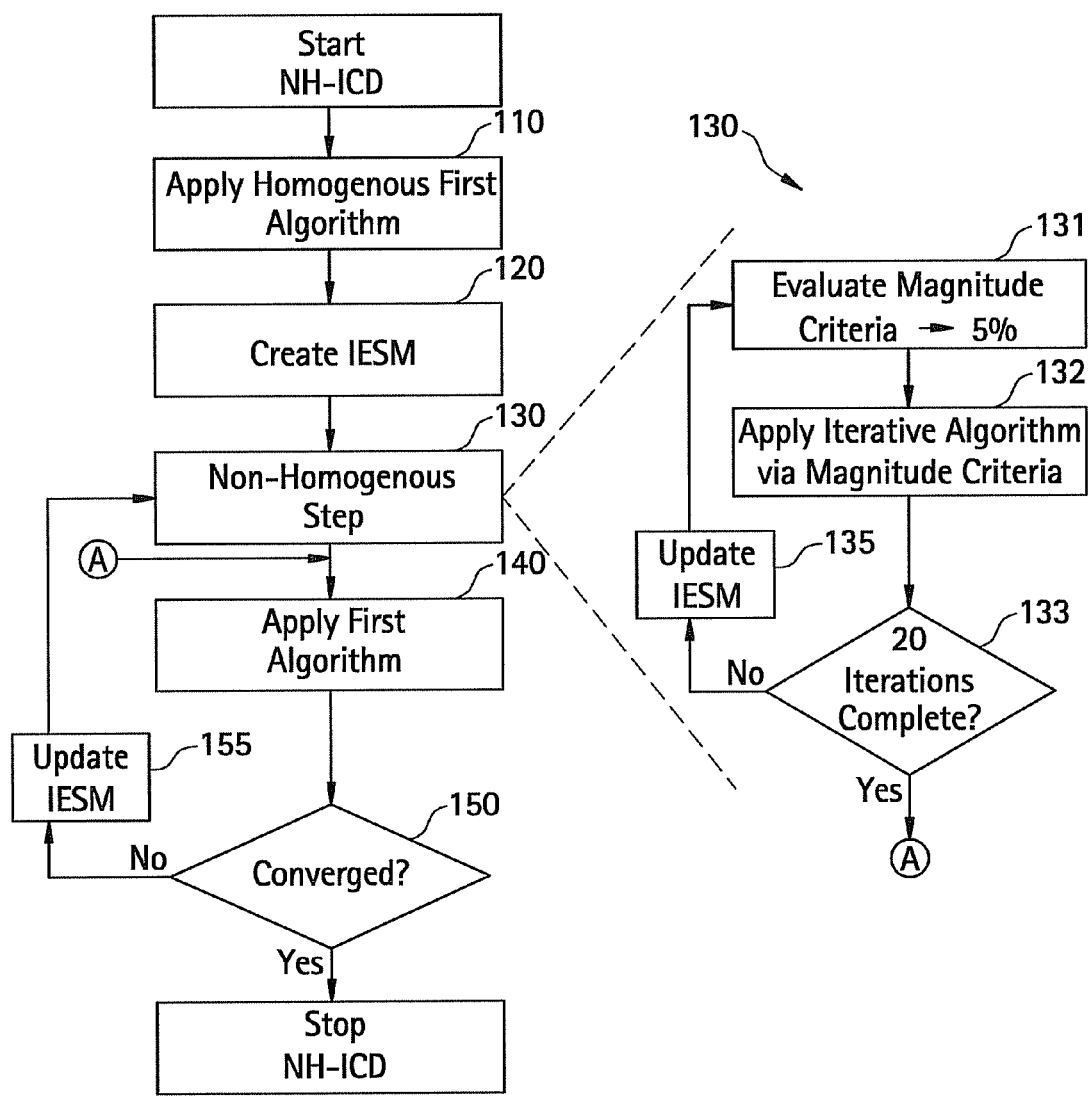
FIG. 3 is a flowchart of an exemplary reconstruction method.

Referring now to FIG. 3, a brief exemplary review of a non-homogenous iterative coordinate descent (NH-ICD) is provided. The NH-ICD process begins by applying 110 the first algorithm (i.e. a homogenous step) at every image element using random selection of the image elements. The process continues by processing the image data for creating 120 the IESM (image element selection map) for each (x,y) position. In this example, the IESM is computed using the mean absolute value of the previous update of each group of image elements along z for the given (x,y) location.

The non-homogeneous step 130 begins with evaluating 131 the magnitude criteria. In this example, the magnitude criteria is specified as the top 5% of image elements within the IESM according to their mean absolute value. Accordingly, the iterative algorithm is applied 132 to the 5% of the image elements with the largest value within the IESM, in randomized order. Next, evaluating 133 the iteration criteria to determine if the non-homogeneous step is complete. In this example, the iteration criteria is 20 iterations. If the 20 iterations have not been completed, the IESM will be updated and sorted 135, and the iterative algorithm will again be applied 132 to the image elements in accordance with the magnitude criteria.

Following the completion of the number of iterations specified by the iteration criteria, the (homogeneous) first algorithm is applied 140 to each image element. This is followed by evaluating 150 a convergence criterion to determine if the plurality of image elements meet the desired level of convergence (as defined by the magnitude of the cost function, for example) has been achieved. If it has, the NH-ICD process is ended. If the desired level of convergence has not been achieved, the IESM is updated 155, and the non-homogenous step 130 is repeated. The update IESM step 155 may include one or more homogeneous iterations, or any of the methods disclosed herein. It will be appreciated that this alternating sequence of non-homogeneous and homogeneous steps is repeated until the desired level of convergence is achieved.

It will also be appreciated that FIG. 3 depicts an update of the IESM preceding each application of the iterative algorithm within the non-homogeneous sub-step. It will be further appreciated, that in this illustrated example, the iteration criteria (20 sub-iterations) and the magnitude criteria (top 5% of the sorted IESM) have been selected that each non-homogenous iteration will result in the application of the iterative algorithm to the same number (100%) of image elements as each application of the first algorithm. It will be appreciated that the above example is intended for illustration, and not limitation.

While the example of FIG. 3 has been described including an update of the IESM preceding each application of the iterative algorithm, it will be appreciated that the scope of the invention is not so limited, and that the invention will also apply to reconstruction methods that may use other IESM update schedules, such as to update the IESM following every two, three, four, or more applications of the iterative algorithm, for example.

In addition, while the example of FIG. 3 has been described having an iteration criteria of 20 sub-iterations, it will be appreciated that the scope of the invention is not so limited, and that the invention will also apply to reconstruction methods that may have an iteration criteria with any number of sub-iterations. While the example of FIG. 3 has been described having a magnitude criteria of the top 5% of the sorted IESM, it will be appreciated that the scope of the invention is not so limited, and that the invention will also apply to reconstruction methods that may use any other appropriate magnitude criteria. While the example of FIG. 3 has been described having a constant magnitude criteria and iteration criteria, it will be appreciated that the scope of the invention is not so limited, and that the invention will also apply to reconstruction methods that may one or both of a magnitude and an iteration criteria that are allowed to change, as may be appropriate.

Further, while the example of FIG. 3 has been described including coordinated magnitude and iteration criteria such that each non-homogeneous iteration will result in the application of the iterative algorithm to the same number of image elements as the application of the first algorithm, it will be appreciated that the scope of the invention is not so limited, and that the invention will also apply to reconstruction methods that may use iteration and magnitude criteria that are not so coordinated.

Figure 4:
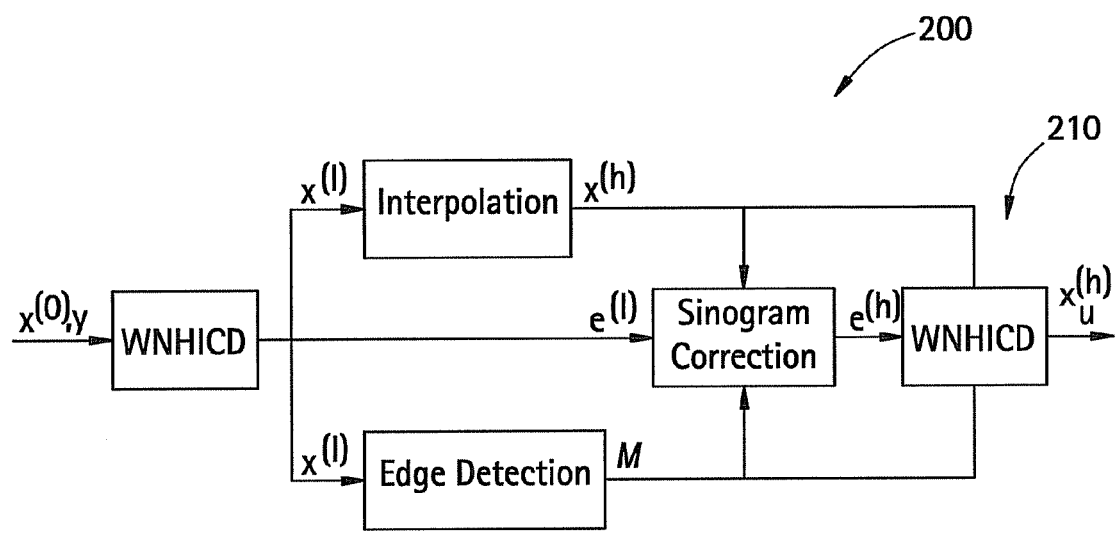
FIG. 4 is a flowchart of an exemplary reconstruction method in accordance with an embodiment of the invention.

Referring to FIGS. 4-8, an exemplary embodiment of a multi-resolution approach of an iterative reconstruction technique 200 that performs a targeted statistical reconstruction is illustrated. An algorithm 202 for this targeted reconstruction is shown in FIG. 4. In FIG. 4, $x^{(0)}$ is an initial FBP image, $x^{(l)}$ is a low-resolution reconstructed image, $x^{(h)}$ denotes a high resolution image interpolated from $x^{(l)}$, and $x_u^{(h)}$ is a reconstructed image of the region of interest in high resolution. Symbols $e^{(l)}$ and $e^{(h)}$ are the error sinogram corresponding to $x^{(l)}$ and $x^{(h)}$ respectively. In executing the algorithm 202, there is first performed a low-resolution construction that updates all the pixels in the full field of view, which includes all of the objects measured by the CT system 10. The FBP images are used in as initial conditions in the low resolution reconstruction. A high resolution reconstruction is then performed using the low resolution reconstructed images as the initial conditions, which updates pixels in a set M formed by all pixels in the region of interest and the high frequency components of the image. Both the low resolution and high resolution use a weighted NH-ICD algorithm (discussed in greater detail below) to improve convergence speed in the region of interest. Further, in transition between the low resolution and high resolution reconstruction, there is performed an edge detection on the low resolution image (which forms the above mentioned set M of pixels), an interpolation of the low resolution images to the desired resolution using (in an exemplary embodiment) a four point bi-cubic interpolation, and a sinogram correction to reduce a sinogram mismatch created by transition in resolution.

Thus, the technique 200 essentially includes a three prong process that involves implementation of a weighted NH-ICD algorithm, a sinogram correction, and a high frequency components update. Each of these three elements of the technique will be discussed hereinbelow, beginning with the weighted NHICD algorithm.

In an exemplary embodiment of the weighted NH-ICD algorithm, a weighting modification to the IESM is introduced to perform preferential updates of the portions of the image volume with high correlation with the region of interest, specifically to achieve fast convergence of the region of interest. Indeed, a targeted reconstruction can require that convergence criteria be met within the region of interest, but not necessarily that a full object in a full field of view be fully converged. Global convergence is needed only to the extent that all the image elements contributing to the image quality within the region of interest have been updated enough times that the region of interest has reached a desired convergence level. In performing the weighted NH-ICD algorithm, a weight is assigned to each pixel location. The weighted algorithm is then applied to the NH-ICD, such as that described in FIG. 3. In the homogenous steps (110 of FIG. 3) of the NH-ICD, this allows rate at which a pixel location is visited in proportion to the weighting function/algorithm. In the non-homogeneous steps (130 of FIG. 3) of the NH-ICD, pixel update criterion is proportional to a product of an update value and weight of the pixels.

In deriving the weighted NH-ICD algorithm, the region of interest is assumed to be (in an exemplary embodiment) a circular region centered at (xo, yo) with a radius R on each slice. The spatial weights assigned to each pixel location are intended to provide a measure of the correlation of each pixel relative to the region of interest. The weighting algorithm is thus modeled as a 2D forward and back projection of the region of interest. The following method is used to empirically compute the weighting algorithm, wherein $x_u$ is the image with all pixels in the region of interest set at a value of 1, and all other pixels set at a value of 0. A 3D image of $x_u$ is first forward projected to a sinogram, and then the sinogram is back projected into a domain of the image. The symbol s denotes the back projected image, such that, $$s = A^T A x_u, \qquad \text{equation 1}$$

wherein A is the forward projection operator and $A^T$ is the back projection operator. Computing s per equation 1 may be thought of as empirically convolving the support of the region of interest $x_u$ with the point spread function of the CT system. A pixel value $s_j$ is allowed to correspond to a contribution of pixel j to the region of interest. The 2D weighting function/algorithm is then computed by summing up the image s along a z axis such that:

$$w(i, j) = \sum_k s(i, j, k). \qquad \text{equation 2}$$

In summary, the above discussed empirical method of computing the weighting function/algorithm performs the 3D forward and back project operation of the region of interest, and then sums up the 3D back projected image to from the 2D weighting function/algorithm. However, it should be noted that this empirical method can be computationally expensive since the use of the operators A and $A^T$ can be quite time-consuming. A less computationally expensive analytical method for computing a 2D weighting function/algorithm which does not require a full forward and back projection is discussed hereinbelow. In this analytical method, a 2D fan beam geometry is used. For the 2D fan beam geometry the operator A TA can be approximated by a point spread function $p(r,\theta)$ in polar coordinates, where r is a distance to a center of the impulse. Furthermore, we assume $p(r,\theta)$ is isotropic. The region of interest in 2D can be represented by an indicator function $g(r,\theta)$, wherein after making a further assumption that $g(r,\theta)$ is rotationally symmetric and therefore does not depend on $\theta$, $$g(r, \theta) = rect\left(\frac{r}{2R}\right), \qquad \text{equation 3}$$

with r denoting a distance to a center of the region of interest, and rect(r) representing a rectangular function defined as $$rect(r) = \begin{cases} 0 & |r| > 1/2 \\ 1 & |r| \le 1/2 \end{cases} \qquad \text{equation 4}$$

The weighting function/algorithm can then be computed analytically by convolving $g(r,\theta)$ with the point spread function $p(r,\theta)$ in 2D which allows $$\tilde{w}(r,\theta) = p(r,\theta)^{**}g(r,\theta) \qquad \text{equation 5}$$

where ** denotes the 2D convolution. Since both $p(r,\theta)$ and $g(r,\theta)$ are isotropic functions, therefore $\tilde{w}(r,\theta)$ is also isotropic, that is, it only depends on r. Empirically, it is found that the following analytical function fits the empirical weighting function well:

$$\tilde{w}(r) = \begin{cases} \ln\frac{r+R+\beta R}{r-R+\beta R} & r > R \\ \ln\frac{(r+R+\beta R)(R-r+\beta R)}{\beta^2 R^2} & r \le R \end{cases} \qquad \text{equation 6}$$

where $\beta$ is a constant for the CT system.
The weighting function/algorithm for each pixel (i,j) is then computed by $$w(i,j) = \tilde{w}(r_{ij}), \qquad \text{equation 7}$$

where $r_{ij}$ is a physical distance of a pixel from the center of the region of interest in millimeters.

With the weighting function/algorithm derived, the function/algorithm may be applied to both the non-homogenous 130 and homogenous 110 steps of the NH-ICD algorithm represented in FIG. 3. In the non-homogenous steps this application is accomplished (in an exemplary embodiment) by multiplying an update map with the weighting function/algorithm before computing the pixel selection criteria (as would be done in a non-homogenous step of an NH-ICD). This allows a pixel selection criteria to be computed by $$S^{(m)}(i, j) = \sum_{p=-2}^{2} \sum_{q=-2}^{2} w(i, j) u^{(m)}(i, j) h(i-p, j-q). \qquad \text{equation 9}$$

where u(i,j) represents the update map for the pixel selection in NH-ICD, and h(i,j) is a smoothing kernel that may be applied to the update map to fill in any gaps possibly existing if the update map was formed after only a partial image update.

In the homogeneous step 110 (see FIG. 3) a modified rejection sampling method is used for pixel selection so that a probability that an individual pixel may be selected is proportional to the assigned weight of the individual pixel. To allow for this weight proportional pixel selection, the homogeneous step of the NH-ICD is divided into eight sub-steps (in an exemplary embodiment), wherein each sub-step includes a selection of N pixels to be updated. In an nth sub-step $O^{(n)}$ indicates pixel selection (that is, a pixel is selected if $O^{(n)}(i, j)$, and $T^{(n)}$ indicates an image of uniformly distributed random variables from 0 to 1, allowing pixels to be selected by $$O^{(n)}(i, j) = \begin{cases} 1 & T^{(n)}(i, j) \le \gamma w(i, j) \\ 0 & T^{(n)}(i, j) > \gamma w(i, j). \end{cases} \qquad \text{equation 10}$$

The probability of selection of each pixel is further calculated by $p_{ij}$ being equal to $\min\{\gamma w(i, j), 1\}$, which is proportional to $w(i, j)$ when $\gamma w(i, j)$ is less than or equal to 1. The symbol $\gamma$ is selected to equal $$\frac{N}{\sum_{i,j} w(i, j)},$$

so that an expected number of pixels to be selected in the sub-step is $$\sum_{i,j} p_{ij} \approx \sum_{i,j} \gamma w(i, j) = N. \qquad \text{equation 11}$$

Figure 5:
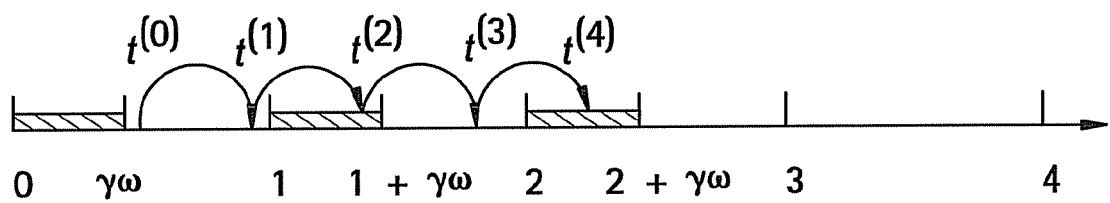
FIG. 5 is a graph depicting a portion of the exemplary reconstruction of FIG. 4.
Figure 10A:
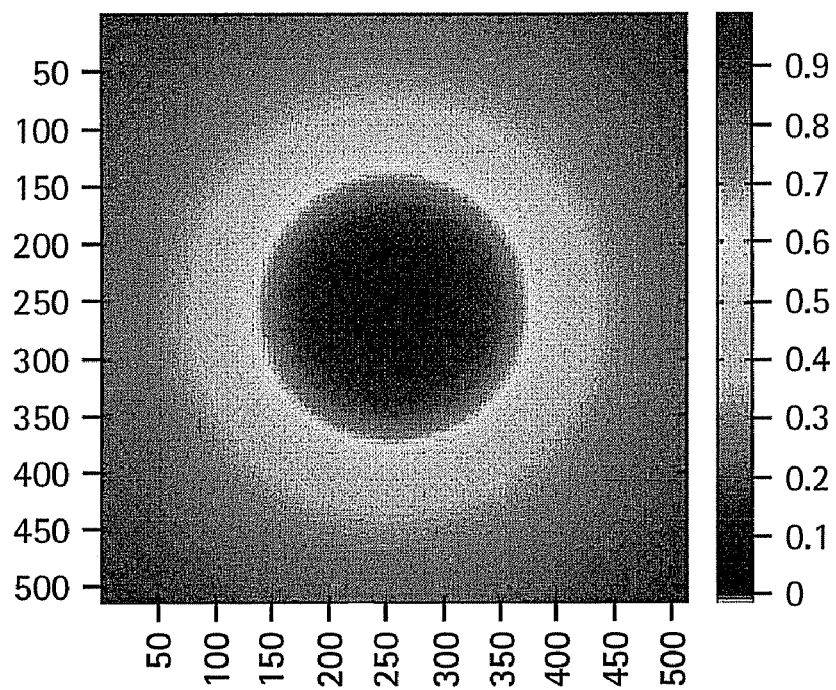
FIGS. 10a-10b are pictorial views illustrating a pictorial representation of a portion of the exemplary reconstruction of FIG. 4.
Figure 10B:
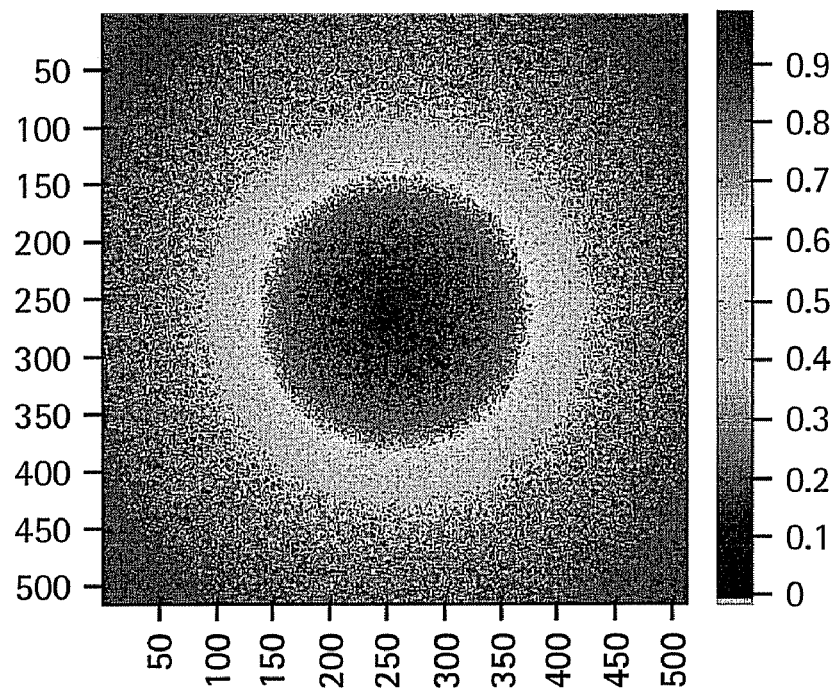

Also provided is a method to update the random map T (see above), the method avoiding that the same pattern be repeated in each homogeneous step if the map T should remain unchanged, and allowing for every pixel to be updated with non-zero probability, wherein $T^{(n)}$ is computed by:

$$T^{(n)}(i,j) = t^{(n)}(i,j) - \lfloor t^{(n)}(i,j) \rfloor, \qquad \text{equation 12}$$

wherein $t^{(n)}$ is updated by $$t^{(n)}(i,j) = t^{(n-1)}(i,j) + \gamma w(i,j), \qquad \text{equation 13}$$

and $t^{(0)}$ is an initial random map of values between 0 and 1 with high frequency properties. $\lfloor t^{(n)}(i,j) \rfloor$ denotes a floor function, and thus, $T^{(n)}(i,j)$ is a random variable uniformly distributed in [0,1]. I should be noted that, in an exemplary embodiment, pixel (i, j) is selected for update only if $\exists m \in N$ such that $m \le t^{(n)}(i, j) \le m + \gamma w(i, j)$. As is shown in FIG. 5, the $t^{(n)}(i, j)$ increments by $\gamma w(i, j)$ at each step. Thus, m and n exist such that $t^{(n)}$ will fall into the interval [m, m+γw(i, j)], which is of length γw(i, j). More particularly, the increments shown in FIG. 5 allow for pixel (i, j) to be selected once every $$\frac{1}{\gamma w(i,j)}$$

times. In short, the above explained rejection technique applied to the random map T guarantees that all image elements can be selected with known probability, avoiding situations where some pixels may not be selected for long periods of time, which might hurt the convergence process. Referring to FIGS. 10a and 10b, an exemplary embodiment of a pixel selection pattern after first and second iterations is shown. A number of pixel visits is larger within the region of interest than outside the region of interest following a shape of the weighting function/algorithm, with all the pixels in the view eventually being visited by the weighting function/algorithm (i.e. no gaps).

Figure 6:
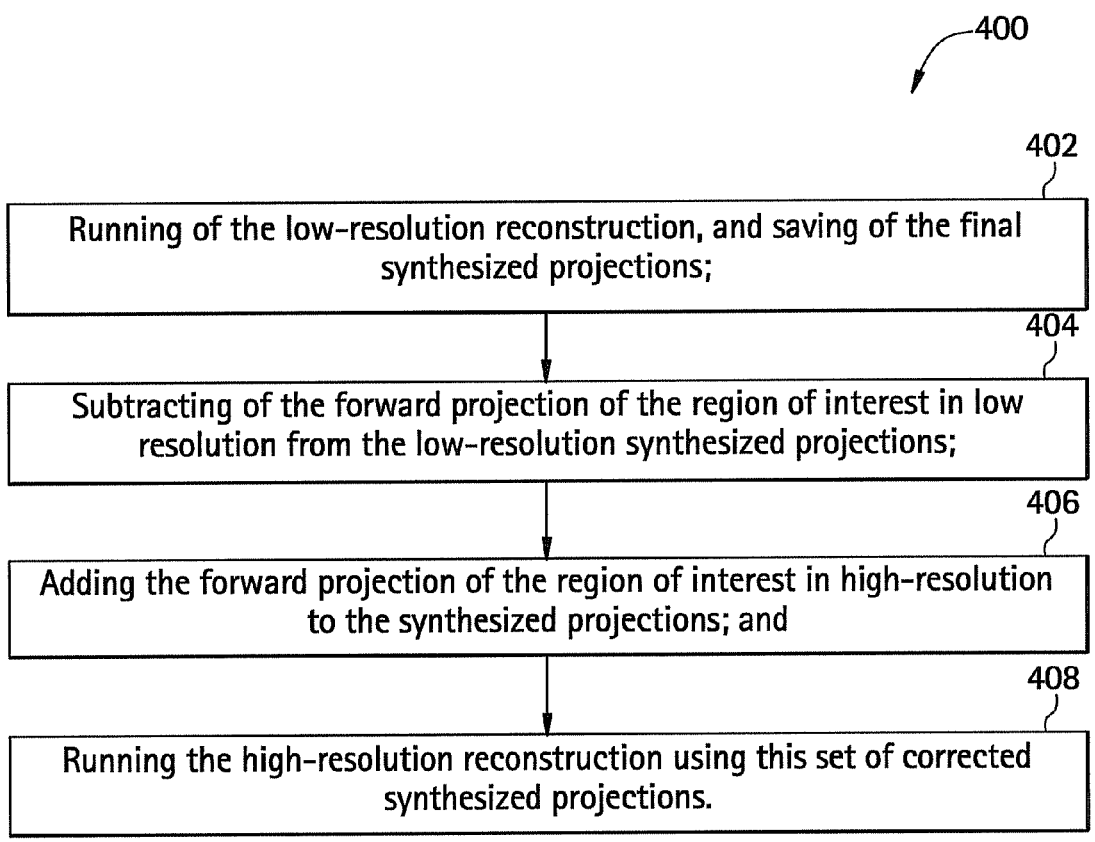
FIG. 6 is a block diagram depicting a portion of the exemplary reconstruction of FIG. 4.
Figure 7:
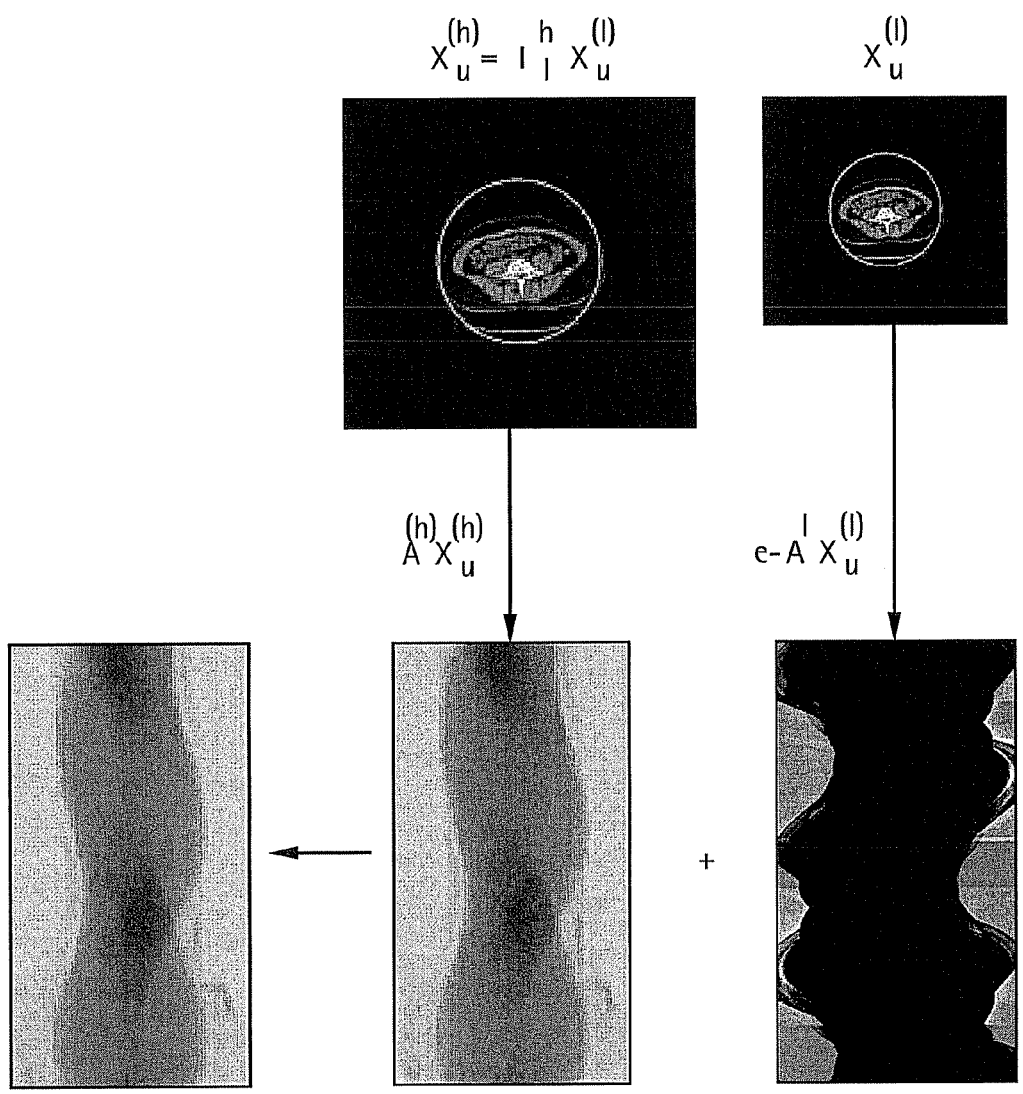
FIG. 7 is a flowchart depicting a portion of the exemplary reconstruction of FIG. 4.

Referring to FIGS. 6 and 7, sinogram correction will now be discussed. Such a corrective measure is necessary because targeted iterative reconstruction typically requires a low-resolution full field of view reconstruction before focusing computation on the target region of interest. Such resolution normally requires a full forward projection in high-resolution, which is computationally expensive. Most models used for forward projection are not scale-invariant, that is the results of the forward projection of an image in low-resolution differ from that of the same image in higher resolution. These errors can introduce artifacts in the reconstruction, as using the low-resolution initial projections for a high-resolution image reconstruction would introduce errors in the form of a mismatch between the forward projection estimates and the image volume. Thus, a high-resolution forward projection is typically needed when restarting a reconstruction in high-resolution. In an exemplary embodiment of the multi-resolution approach of an iterative reconstruction technique 200, reconstruction convergence is achieved at a faster speed by reusing the synthesized projections already obtained at the end of the low-resolution reconstruction, provided a correction is applied for the change of resolution.

A method 400 for this efficient reconstruction is illustrated in FIG. 6, which illustrates a running of the low-resolution reconstruction, and saving of the final synthesized projections, as shown in operational block 402, and a subtracting of the forward projection of the region of interest in low resolution from the low-resolution synthesized projections, as shown in operational block 404. The method 400 also includes adding the forward projection of the region of interest in high-resolution to the synthesized projections, as shown in operational block 406, and running the high-resolution reconstruction using this set of corrected synthesized projections, as shown in operational block 408. The result of this sonogram correction is equivalent to a multi-resolution forward projection, wherein the region-of-interest (or the set M, in another embodiment) is forward projected in high-resolution, whereas the rest of the image volume is forward projected in low-resolution.

This method 400 has the result of correcting the model for the change in resolution for all the region of interest-related elements at a fraction of the computational cost necessary for a full forward projection in high-resolution. Once this is done, the high-resolution reconstruction proceeds by updating only the pixels within the region of interest (or the set M, in another embodiment).

With reference to FIG. 7, the above sinogram correction method will now be described hereinbelow in more empirical detail. In a multi resolution ICD function/algorithm (as shown below) $A^{(l)}$ and $A^{(h)}$ denote a system matrix corresponding to the low resolution image $x^{(l)}$ and the high resolution image $x^{(h)}$ respectively, and $I_l^h$ denotes an interpolation operator of the image, that is, $x^{(h)}=I_l^h x^{(l)}$. However, when the forward model is not scale invariant, then $A^{(l)}x^{(l)}$ does not equal $A^{(h)}I_l^h x^{(l)}$. Although the difference between $A^{(l)}x^{(1)}$ and $A^{(h)}I_l^h x^{(l)}$ may be small, to achieve a desired image quality, the error sinogram should be corrected before being re-used for the high resolution construction. As is mentioned above, a full forward projection of the high resolution image can create a correct initial error sinogram, but such an action is computationally expensive. Below is an empirically detailed method for error sinogram correction.

In correcting the error sinogram, it is first noted that $x^{(l)}=[u^{(l)}, v^{(l)}]^T$, wherein $u^{(l)}$ contains all of the targeted pixels to be updated in the high resolution reconstruction, and $v^{(l)}$ represents all of the remaining pixels. Similarly, $x^{(h)}=[u^{(h)}, v^{(h)}]^T$. Additionally, the interpolation is of an integer factor L so that each pixel in the low resolution image can be split into exactly $L^2$ pixels in high resolution. In the sinogram correction, the forward projection of $u^{(l)}$ is replaced by the forward projection of $u^{(h)}$, wherein the forward projection of $u^{(l)}$ is then subtracted from the corrected sinogram (that is, $e \leftarrow e - A^{(l)}[u^{(l)},0]^T$), and the interpolated target pixels $u^{(h)}$ are added to the error sinogram (that is, $e \leftarrow e + A^{(h)}[U^{(h)}, 0]^T$). This renders a corrected sinogram of:

$$e = A^{(h)}[u^{(h)},0]^T + A^{(l)}[0,v^{(l)}]^T - y, \qquad \text{equation 14}$$

which is equivalent to a forward projection in high resolution in the targeted area and low resolution in the remaining area.

Figure 8:
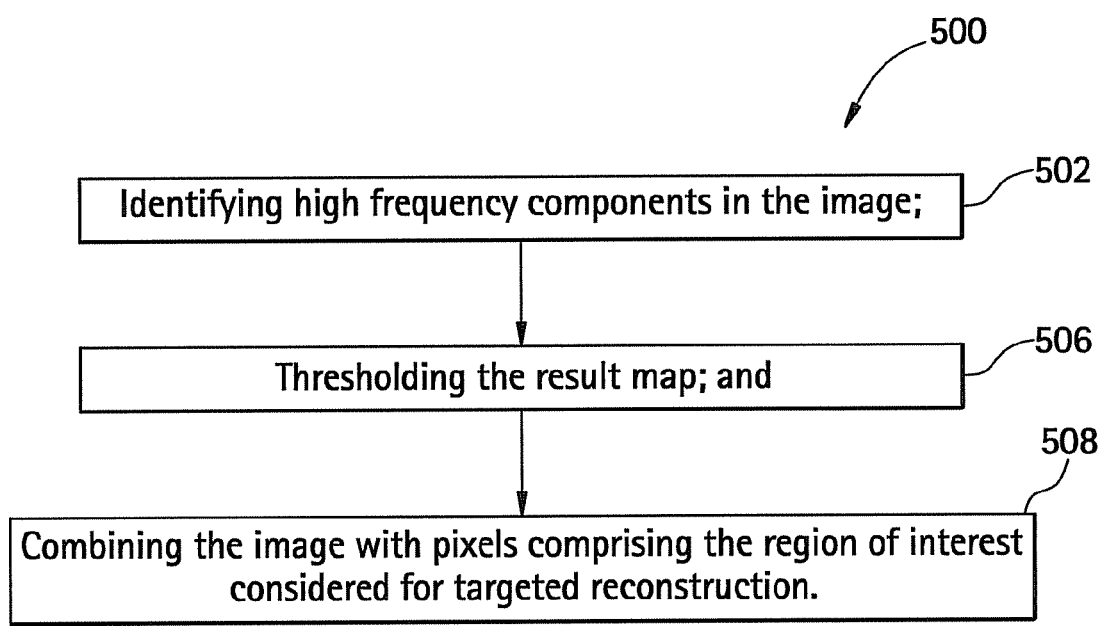
FIG. 8 is a block diagram depicting a portion of the exemplary reconstruction of FIG. 4.

Referring to FIG. 8, the high frequency components update will now be discussed. It is noted that lack of convergence in portions of the volume outside the region of interest may still (after error sinogram correction) negatively affect the pixels inside of the region of interest, as their corresponding projections may contain remaining errors from the low-resolution reconstruction. The largest of these errors originate from the high-frequency components of the image volume outside the region of interest (sharp edges and transitions). Referring to the method 500 of FIG. 8, there is illustrated an updating of the set of pixels updated in high-resolution with the pixels in the edges of the imaged object outside of the ROI. This updating can be performed by identifying high frequency components in the image (see block 502), for instance by running a Sobel edge detector, in an exemplary embodiment, thresholding the resulting map (see block 504), and combining the image map with pixels comprising the region of interest considered for targeted reconstruction (see block 506). This has the effect of improving the reconstruction image quality within the region of interest by minimizing the errors introduced by image components outside of the region of interest when only the region of interest is updated in the high-resolution reconstruction. An algorithm used for selecting high frequency components is discussed below.

An edge detection algorithm is performed at the end of the low resolution reconstruction in order to identify high frequency components in the image. Since pixels are selected in a 2D xy plane, the image is first summed up along the z-axis, that is, $$s(i, j) = \sum_k x(i, j, k).  \quad \text{equation 15}$$

In an exemplary embodiment, a Sobel edge detector is then applied to s, and the x and y coordinates are computed separately as:

$$g_x(i, j) = \sum_{p=-2}^{2} \sum_{q=-2}^{2} s(i, j)h_x(i, j)h(i-p, j-q), \text{ and} \quad \text{equation 16}$$

$$g_y(i, j) = \sum_{p=-2}^{2} \sum_{q=-2}^{2} s(i, j)h_y(i, j)h(i-p, j-q), \quad \text{equation 17}$$

wherein $h_x$ and $h_y$ are horizontal and vertical kernels of the Sobel edge detector. The x and y components are then combined by a simple absolute sum:

$$g(i,j)=|g_x(i,j)|+|g^y(i,j)|.  \quad \text{equation 18}$$

Next the image g is thresholded to keep a top five percent of pixels in g. A morphological closing is then used to fill in any small gaps that may exist in the edge map. This is a standard operation of dilation followed by erosion. The resulting edge map is then combined with the pixels in the region of interest to form the set M. The high-resolution region of interest reconstruction then focuses on updating the image elements in the set M, while the rest of the image volume remains unchanged (and corresponds to the results of the low-resolution reconstruction, hence the denomination of "multi-resolution" for the proposed algorithm).

Results

Application (upon an exemplary clinical data set) of the above discussed iterative reconstruction technique 200 for performing targeted statistical reconstruction will now be discussed. In this exemplary data set, a helical scan with a pitch of 1.375 is provided, with the targeted area being of a radius of 319 mm. Referring to FIG. 9*a*, a low resolution reconstructed image 600 that is sized at 562 by 562 in a 700 mm field view is illustrated. FIG. 9*b* shows a high resolution reconstructed image 610 of a targeted area 620 that is sized at 512 by 512 in a 319 mm field view. In general, CT images are reconstructed in 512×512 matrix size regardless of the selected diameter of the region of interest on current commercial scanners. Note that any matrix size and diameter of the field of view can be supported by the disclosed reconstruction algorithm.

The above-discussed analytical weighting function/algorithm is represented pictorially (for this exemplary clinical data set) in FIG. 10*a*, wherein the weighting function is normalized so that a maximum of the weight is 1. FIG. 10*b* shows pixels selected in two consecutive homogenous steps of an NH-ICD technique, wherein value of the pixel(s) represents a number of visits to the pixel location in the two steps. The content of FIG. 10*b* resembles the weighting function content illustrated in 10*a*, which implies that frequency of each pixel is sampled proportionally to pixel weights. Moreover, 99 percent pixels are sampled in the above-discussed 8 substeps.

Figure 11:
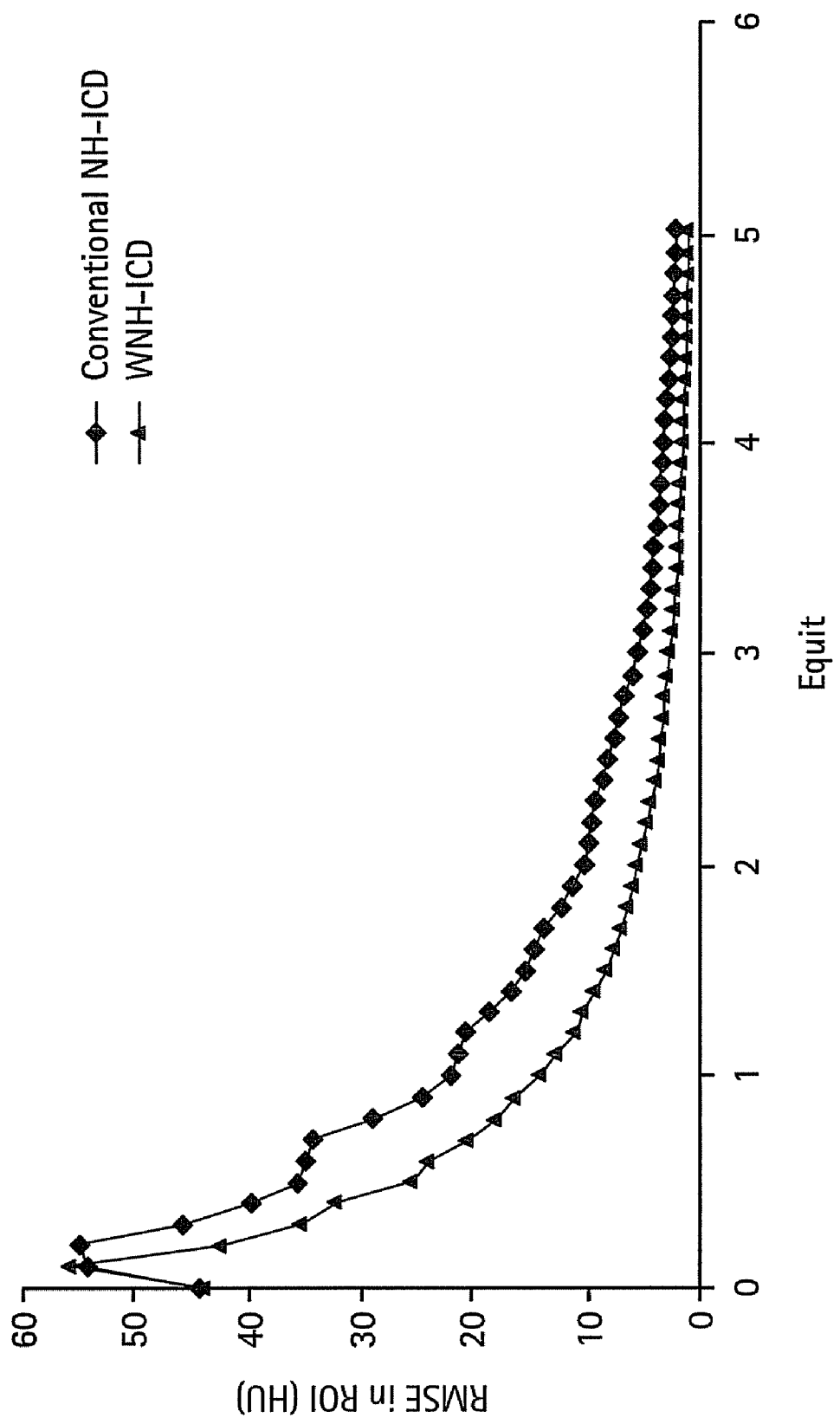
FIG. 11 is a convergence plot illustrating comparative results of at least a portion the exemplary reconstruction of FIG. 4.

In order to compare the convergence speed of the weighted NH-ICD function/algorithm to a conventional NH-ICD function/algorithm for targeted reconstruction, a measure of image quality and computational cost must first be defined. Image quality may be measured via root mean squared error (RMSE) over the region of interest pixels in the reconstructed image. Allowing x* to denote an reference image obtained by reconstructing the images in a full field view for 10 iterations of ICD, so as to achieve essentially full convergence, the RMSE is then computed as:

$$RMSE = \sqrt{\frac{1}{|U|}\sum_{i \in U}|x_i - x_i^*|^2}, \quad \text{equation 19}$$

Where U is the set of region of interest pixels and |U| denotes a number of elements in U. The computation cost is measured by the number of pixel updates. A unit "equit" (equivalent iteration) is defined to be equal to the number of total pixels in the image volume. In the conventional ICD algorithm, 1 equit equals 1 iteration of updates. FIG. 11 shows the convergence plot of the conventional NH-ICD algorithm and the weighted NH-ICD algorithm for the low-resolution reconstruction. The convergence plot shows that the weighted NH-ICD algorithm converges faster than the non-weighted NH-ICD algorithm in the region of interest area. To achieve a fixed image quality level, for example RMSE=4HU, the conventional NH-ICD method takes 3.4 equits while the weighted NH-ICD method takes only 2.4 equits. In this example, the convergence speed is improved by around 30%.

Figure 12A:
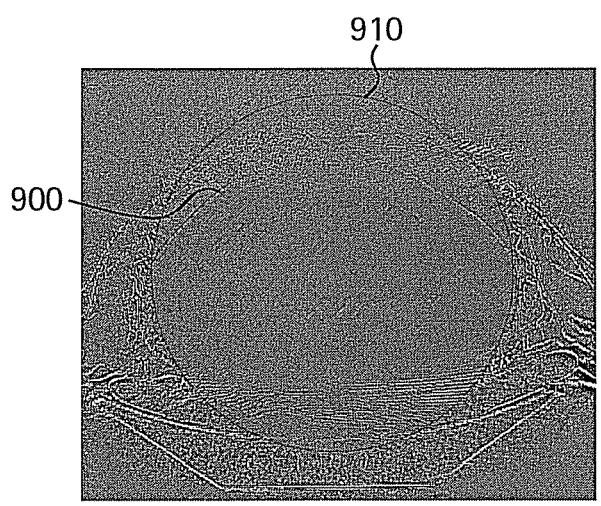
FIGS. 12a-12c are pictorial views illustrating a pictorial representation of comparative results of at least a portion of the exemplary reconstruction of FIG. 4.
Figure 12B:
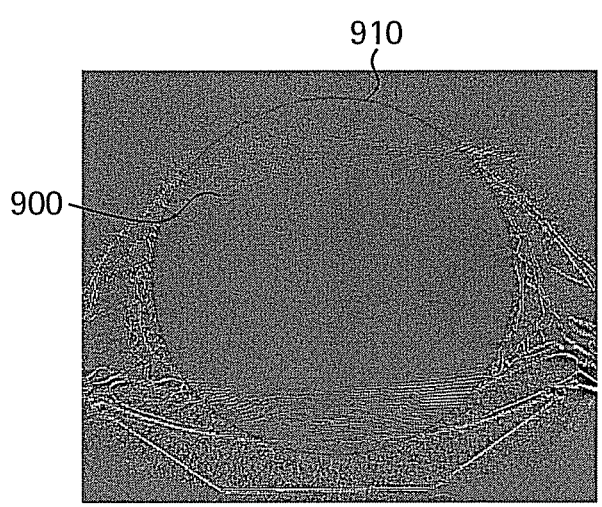
Figure 12C:
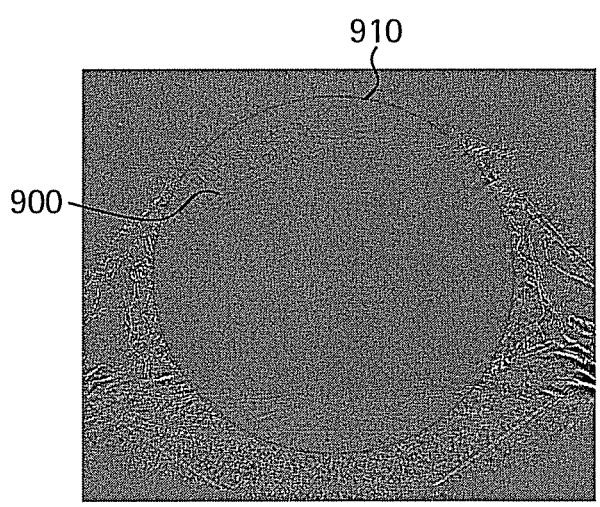

The sinogram correction method and the high frequency components updating method were also found to have an on the image quality. FIGS. 12*a*-*c* shows the error image of different reconstruction methods. The error images are shown in the window of [−50, 50] HU. The region of interest is the region 900 inside the circle 910. In FIG. 12*a*, the images are reconstructed using the multi-resolution method without sinogram correction or high-frequency components update. In FIG. 12*b* the images are reconstructed with the sinogram correction but without high-frequency components update. Finally, in FIG. 12*c* both the sinogram correction and high-frequency components update methods are applied. Large errors in 12*a* are observed at edges and the image also suffers from the aliasing artifacts. By applying the sinogram correction method, both the errors in the edges and the aliasing artifacts are significantly reduced, as shown in FIG. 12*b*. In addition, by updating the high frequency components, the artifacts are further reduced, as shown in FIG. 12*c*. The RMSE of each image also reflects the reduction of the error. The RMSE is 12.54 HU in FIG. 12*a*, 9.31 HU in FIG. 12*b*, and 5.83 HU in FIG. 12*c*.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to perform a tomographic reconstruction from acquired projection data.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An imaging system comprising:
a source generating an x-ray beam;
a detector array receiving said x-ray beam and generating projection data;
a translatable table configured for disposal of an object thereon and operable to translate in relation to said source and said detector array;
said source and said detector array rotating about said translatable table to scan said object; and
an image reconstructor electrically coupled to said detector array and configured to reconstruct an image in response to said projection data via an iterative reconstruction technique configured to perform a targeted statistical reconstruction;
wherein the image reconstructor is configured to perform said iterative reconstruction technique by weighting each of a plurality of pixels in said image according to a contribution of each of said pixels to a region of interest;
the image reconstructor is further configured to perform said iterative reconstruction technique by updating in low resolution each of said plurality of pixels that said weighting determines to be most contributory to said region of interest;
the image reconstructor is further configured to perform said iterative reconstruction technique by performing a high resolution forward projection in said region of interest and performing a low resolution forward projection over the remaining area of said image; and
the image reconstructor is further configured to perform said iterative reconstruction technique by correcting for a resulting cumulative forward projection that is not scale-invariant.

2. The system of claim 1, wherein said iterative reconstruction technique, in performing said target statistical reconstruction, includes an update in high resolution of high frequency components disposed outside of the region of interest.

3. The system of claim 1, wherein, the imaging system comprises a computed tomography (CT) imaging system.

4. A method of reconstructing an image of an object comprising:
providing projection data generated by a scanning device; and
performing an iterative reconstruction technique to reconstruct the image in response to said projection data, wherein said reconstruction technique performs a targeted statistical reconstruction;
wherein said performing said iterative reconstruction technique, in performing said targeted statistical reconstruction, includes: weighting each of a plurality of pixels in said image according to a contribution of each of said pixels to a region of interest, and updating in low resolution of each of said plurality of pixels that said weighting determines to be most contributory to said region of interest, said weighting and said updating implemented via a weighted non-homogeneous coordinate descent algorithm;
wherein said performing said iterative reconstruction technique, in performing said targeted statistical reconstruction, includes performing a high resolution forward projection in said region of interest and performance of a low resolution forward projection over a remaining area of said image, wherein said performing said iterative reconstruction technique, in performing said targeted statistical reconstruction also includes correcting for a resulting cumulative forward projection that is not scale-invariant;
wherein said performing and said correcting include running a low resolution reconstruction and saving final low resolution synthesized projections derived from said low resolution reconstruction, subtracting a region of interest portion of said low resolution forward projection from said final low resolution synthesized projections, adding said high resolution forward projection of said region of interest to said final low resolution synthesized projections, said adding and said subtracting creating a set of corrected synthesized projections, and running n a high resolution reconstructing using said set of corrected synthesized projections.

5. The method of claim 4, wherein a high individual weight is assigned to each of said plurality of pixels most closely related to said region of interest, said updating occurring for those of said plurality of pixels that are assigned said high individual weight.

6. The method of claim 5, wherein said iterative reconstruction technique includes using said weighting and said updating to increase convergence speed in said region of interest.

7. The method of claim 4, further including implementing said performing and said correcting via a corrected error sinogram.

8. The method of claim 4, wherein said high resolution forward construction and said low resolution forward construction are not scale-invariant, and said reconstruction technique includes using said performing and said correcting to correct for the non-scale-invariance of said high resolution forward construction and said low resolution forward construction.

9. The method of claim 4, wherein said performing said iterative reconstruction technique, in performing said targeted statistical reconstruction, includes an updating in high resolution of high frequency components disposed outside of the region of interest and an updating of the elements disposed inside of the region of interest.

10. The method of claim 9, further including performing an edge detection algorithm at an end of a low resolution reconstruction to identify said high frequency components.

11. The method of claim 10, wherein said performing occurs via a Sobel edge detector to detect edges.

12. The method of claim 11, further including thresholding an image map resulting from said running of said Sobel edge detector.

13. The method of claim 12, further including combining said image map with pixels comprising said region of interest.

14. The method of claim 9, wherein said iterative reconstruction technique includes using said updating to improve reconstruction quality of the image.

15. A method of reconstructing an image comprising:
scanning an object to acquire projection data;
performing an iterative reconstruction technique to reconstruct the image in response to said projection data, wherein said reconstruction technique includes,
weighting each of a plurality of pixels in said image according to a contribution of each of said pixels to a region of interest,
updating in low resolution each of said plurality of pixels that said weighting determines to be most contributory to said region of interest,
performing a high resolution forward projection in said region of interest and performing a low resolution forward projection over the remaining area of said image,
correcting for a resulting cumulative forward projection that is not scale-invariant, and
updating in high resolution high frequency components disposed outside of said region of interest; and
performing a targeted statistical reconstruction via said iterative reconstruction technique.

16. The method of claim 15, wherein said iterative reconstruction technique employs a weighted non-homogenous iterative coordinate descent algorithm, which incorporates said weighting, said updating, said performing, said correcting, and said updating, in order to perform said targeted statistical reconstruction.

17. A method of reconstructing an image of an object comprising:
providing projection data generated by a scanning device;
performing an iterative reconstruction technique to reconstruct the image in response to said projection data, wherein said reconstruction technique performs a targeted statistical reconstruction;
wherein said performing said reconstruction technique, in performing said targeted statistical reconstruction, includes:
performing a high resolution forward projection in a region of interest and performing a low resolution forward projection over a remaining area of said image;
correcting for a resulting cumulative forward projection that is not scale-invariant by:
performing a low resolution reconstruction and saving final low resolution synthesized projections derived from said low resolution reconstruction; and
subtracting a region of interest portion of said low resolution forward projection from said from final low resolution synthesized projections; and
adding said high resolution forward projection of said region of interest to said final low resolution synthesized projections to obtain a set of corrected synthesized projections; and
performing a high resolution reconstructing using said set of corrected synthesized projections.

* * * * *

UNITED STATES PATENT AND TRADEMARK OFFICE
CERTIFICATE OF CORRECTION

| | |
|---|---|
| PATENT NO. | : 8,135,186 B2 |
| APPLICATION NO. | : 12/020311 |
| DATED | : March 13, 2012 |
| INVENTOR(S) | : Bouman et al. |

It is certified that error appears in the above-identified patent and that said Letters Patent is hereby corrected as shown below:

In Column 8, Line 45, delete "(xo, yo)" and insert -- $(x_0, y_0)$ --, therefor.

In Column 9, Line 18, delete "A TA" and insert -- $A^T A$ --, therefor.

In Column 13, Line 22, in Equation 18, delete "$g(i,j) = |g_x(i,j)| + |g^y(i,j)|$," and insert -- $g(i,j) = |g_x(i,j)| + |g_y(i,j)|$. --, therefor.

In Column 16, Line 30, in Claim 4, delete "reconstruction" and insert -- reconstruction, --, therefor.

In Column 16, Line 42, in Claim 4, delete "running n" and insert -- running --, therefor.

Signed and Sealed this
Twelfth Day of June, 2012

David J. Kappos
*Director of the United States Patent and Trademark Office*